(12) United States Patent
Pauthier et al.

(10) Patent No.: US 9,022,419 B2
(45) Date of Patent: May 5, 2015

(54) SAFETY DEVICE FOR VEHICLE

(71) Applicants: Fabrice Pauthier, L'Isle-Adam (FR); Thierry Schupbach, Saint Crepin Ibouvilleiers (FR)

(72) Inventors: Fabrice Pauthier, L'Isle-Adam (FR); Thierry Schupbach, Saint Crepin Ibouvilleiers (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/303,379

(22) Filed: Jun. 12, 2014

(65) Prior Publication Data

US 2014/0375025 A1    Dec. 25, 2014

(30) Foreign Application Priority Data

Jun. 24, 2013 (FR) ...................................... 13 56017

(51) Int. Cl.
| | | |
|---|---|---|
| *B60R 21/215* | (2011.01) | |
| *B60R 21/205* | (2011.01) | |
| *B60R 21/216* | (2011.01) | |
| *B60R 21/2165* | (2011.01) | |

(52) U.S. Cl.
CPC ............. *B60R 21/205* (2013.01); *B60R 21/216* (2013.01); *B60R 21/2165* (2013.01); *B60R 21/215* (2013.01); *B60R 2021/21537* (2013.01); *B60R 2021/2161* (2013.01)

(58) Field of Classification Search
CPC ................... B60R 21/215; B60R 2021/21537; B60R 21/216; B60R 2921/2161

USPC ......................................................... 280/728.3
See application file for complete search history.

(56) References Cited

U.S. PATENT DOCUMENTS

| | | | | |
|---|---|---|---|---|
| 5,639,115 A | * | 6/1997 | Kelley et al. ................ | 280/728.3 |
| 6,623,029 B2 | * | 9/2003 | Sun et al. .................... | 280/728.2 |
| 8,590,923 B2 | * | 11/2013 | An ............................. | 280/728.3 |
| 8,714,583 B2 | * | 5/2014 | Tromp ........................ | 280/728.3 |
| 2006/0043701 A1 | | 3/2006 | Zagrodnicki | |
| 2009/0026740 A1 | * | 1/2009 | Dorn .......................... | 280/728.3 |

FOREIGN PATENT DOCUMENTS

| | | |
|---|---|---|
| EP | 2096006 A1 | 9/2009 |
| FR | 2927290 A1 | 8/2009 |
| FR | 2970921 A1 | 8/2012 |
| WO | WO 2007/147966 A2 | 12/2007 |

* cited by examiner

*Primary Examiner* — Ruth Ilan
(74) *Attorney, Agent, or Firm* — Miller, Matthias & Hull LLP

(57) ABSTRACT

Safety device for vehicle, adapted to be arranged facing an airbag, comprising a chute channel delimiting a recess adapted to receive the airbag, said chute channel being formed by a reinforcing member, a first flap, and a first net. The first lap and a first reinforcing portion are overmolded onto the first net, which defines a hinge allowing the first flap to move relative to the first reinforcing portion. The device further comprises a second reinforcing portion overmolded onto the first net, and said first net defines a second hinge allowing the first reinforcing portion to pivot relative to the second reinforcing portion so that the first reinforcing portion is folded back onto the second reinforcing portion to form a transverse wall of the chute channel. Method for manufacturing such a safety device.

11 Claims, 4 Drawing Sheets

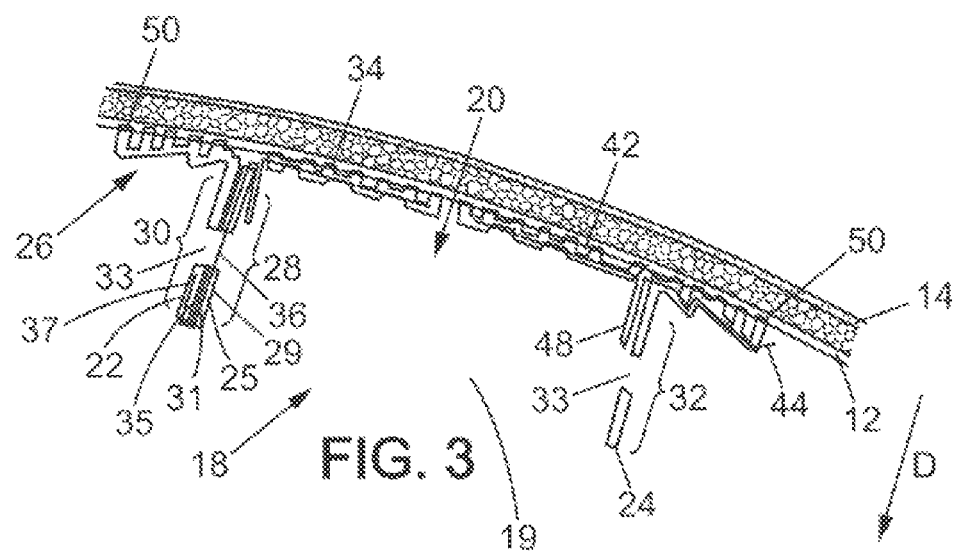
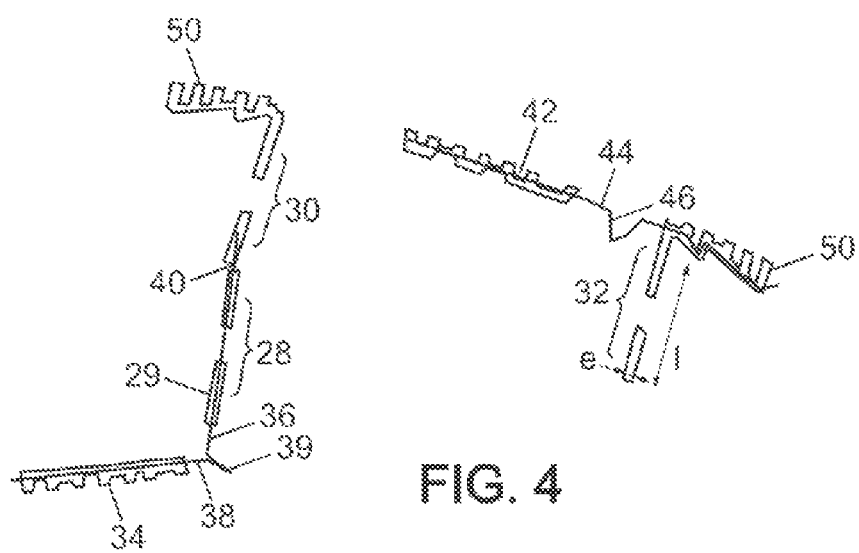

SAFETY DEVICE FOR VEHICLE

CROSS-REFERENCE TO RELATED APPLICATION

This application claims priority under the Paris Convention to French Patent Application No, 13 56017 fled on Jun. 24, 2013.

FIELD OF THE DISCLOSURE

The present invention relates to safety devices adapted to be arranged facing an airbag.

Already conventionally known is a safety device adapted to be arranged facing an airbag, comprising:
- a chute channel delimiting a recess adapted to receive the airbag, the chute channel further delimiting an opening for deployment of the airbag, the chute channel being formed by a reinforcing member suitable for attachment to an element of the vehicle interior trim, said reinforcing member comprising a first reinforcing portion and a second reinforcing portion,
- a first flap at least partially covering the opening,
- a first net, the first flap and the first reinforcing portion being overmolded onto the first net, and said first net defining a first intermediate net portion between the first flap and the first reinforcing portion, the first intermediate portion functioning as a hinge allowing movement of the first flap relative to the first reinforcing portion so as to release the airbag when an impact occurs.

BACKGROUND OF THE DISCLOSURE

Document FR2927290 discloses an example of such a safety device. Specifically, document FR2927290 discloses a safety device comprising a chute channel, a reinforcing member having a portion intended to be attached directly on the vehicle interior trim element, a first net, and a first flap. Part of the first net forms a hinge between the first flap and the reinforcing member. The portion of the reinforcing member intended to be attached directly on the interior trim element and the first flap are overmolded onto the first net within the same mold and during the same molding operation, resulting in the formation of an "unsupported" area near the line of least resistance intended to open with the flap but to which the flap is not attached. This area is likely to break off and be thrown into the passenger area of the vehicle.

Document FR2970921 also discloses an example of a safety device as described above, comprising a separate part overmolded onto the net along with the flap and attached to one of the walls of the chute channel. This solution reduces the "unsupported" area. However, this solution is expensive and not very robust, and is therefore not entirely satisfactory.

The present invention aims to improve the existing devices, in order to reduce the risk of injury to occupants of the vehicle while avoiding an increase in the weight and price of the assembly.

SUMMARY OF THE DISCLOSURE

For this purpose, according to the invention, a device of the kind in question is characterized in that the second reinforcing portion is also overmolded onto the first net, and said first net defines a second intermediate portion between the first reinforcing portion and the second intermediate portion, functioning as a hinge allowing the first portion to pivot relative to the second portion so as to fold the first reinforcing portion over the second reinforcing portion in order to form a side wall of the chute channel.

Thus, a wall transverse to the chute channel is manufactured in a non-linked manner and can easily be moved in the "operational" position. As the second hinge connection allows pivoting, the "non-reinforced" flap area is substantially reduced in a simple manner while preserving a single overmolding operation.

In preferred embodiments of the invention, one or more of the following arrangements may be used:
- the first net forms a loop between the first flap and the first reinforcing portion. During the deployment of the airbag, the first flap swings about a non-fixed transverse axis into the passenger area of the vehicle, which means greater freedom of movement, less stress on the flap, less risk of the flap breaking, and therefore less risk of pieces flying into the passenger area of the vehicle. In addition, the loop allows easy adjustment of the length of the hinge;
- a second flap is provided, said first and second flaps at least partially covering said opening. The use of two flaps reduces the length of each flap;
- the first and second flaps are adjacent to each other and are arranged to be connected by a line of least resistance (also called weakening line) intended to break during deployment of the airbag; the weakening line is substantially in the shape of an "H". In this "H" configuration, the airbag can advantageously be moved closer to the windshield of the vehicle;
- said reinforcing member further comprises a third reinforcing portion, and the third reinforcing portion and the second flap are at least partially overmolded onto a second net, said second net defining an intermediate net portion situated between the second flap and the third reinforcing portion, said intermediate portion functioning as a hinge allowing the second flap to move relative to the third reinforcing portion. The net acts as an efficient and sturdy hinge connection;
- the second net forms a loop between the second flap and the third reinforcing portion. The second flap swings into the passenger area of the vehicle about a non-fixed transverse axis, which means greater freedom of movement, less stress on the flap, and less risk of the flap breaking and parts freely moving into the passenger area of the vehicle;
- the reinforcing member further comprises a fastening strip delineating the opening and intended to be placed facing the interior trim element. The fastening strip assembles the safety device to the interior trim element;
- the fastening strip is formed integrally with at least a portion of the second reinforcing portion and at least a portion of the third reinforcing portion, said fastening strip forming a non-zero angle with the second reinforcing portion and the third reinforcing portion respectively. The reinforcing member is adapted for sturdy attachment to the chute channel;
- the reinforcing member is created by injection molding. Injection molding is particularly suitable for mass production;
- the first and second reinforcing portions are manufactured in an open position where the first reinforcing portion is aligned with the second reinforcing portion, then is folded over the first reinforcing portion into an operative position where the first portion is facing the second portion. Only one molding step is required to create the reinforcing member-flap-net system;

the first and second reinforcing portions have a hole for receiving an airbag support hook. Airbag assembly is simple and reliable.

The invention also relates to a method for manufacturing a device as described above comprising a fastening strip delineating the opening and intended to be arranged facing the interior trim element, said method comprising the steps of:

manufacturing the reinforcing member, first flap, and second flap, by overmolding the fastening strip, first reinforcing portion, second reinforcing portion, and first flap onto the first net, and by overmolding the fastening strip, third reinforcing portion, and second flap onto the second net, the first and second reinforcing portions being manufactured in an aligned position, the fastening strip and second flap being manufactured in an aligned position, and the first flap being manufactured in an aligned position facing the fastening strip;

folding the first reinforcing portion over the second reinforcing portion, pushing back the first flap so that it is arranged in line with the fastening strip, moving the second flap translationally so that it is arranged in line with the fastening strip.

With these arrangements, only one molding step is required.

In a preferred embodiment of the method according to the invention, the following arrangement may optionally be used:

the steps consisting of folding the first reinforcing portion over the second reinforcing portion and pushing back the first flap so that it is arranged in line with the fastening strip are performed simultaneously;

the reinforcing member, the first and second flaps, and the first and second nets are formed in a final countermold before vibration welding the safety device to the interior trim element. The countermold ensures the positioning of the safety device which is not yet connected together after the manufacture of the reinforcing member, first flap, and second flap by overmolding the fastening strip, first reinforcing portion, second reinforcing portion, and first flap on the first net, and by overmolding the fastening strip, third reinforcing portion, and second flap on the second net;

the reinforcing member and the first and second flaps are manufactured by injection molding in a rotating mold.

Lastly, the invention relates to a vehicle dashboard comprising a dashboard body covering an airbag, characterized in that it comprises a device as described above, attached to an inner surface of the dashboard body by vibration welding and assembled with the airbag.

BRIEF DESCRIPTION OF THE DRAWINGS

Other features and advantages of the invention will be apparent from the following description of one of its embodiments, given by way of non-limiting example, with reference to the accompanying drawings.

In the drawings:

FIG. 3 is a schematic sectional view of the safety device of FIG. 1, FIG. 4 is a schematic sectional view of the safety device of FIG. 1 in the molding position.

In the different figures, the same references are used to denote identical or similar elements.

DETAILED DESCRIPTION

Figure 1:
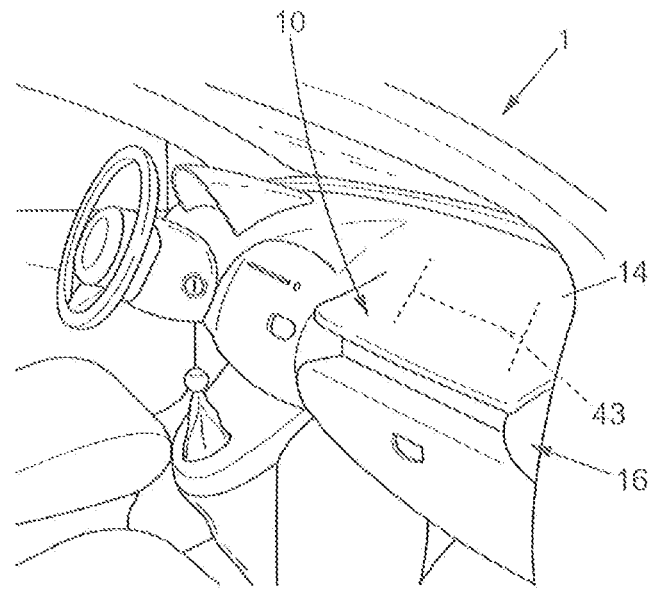
FIG. 1 is a schematic perspective view of the passenger area of a vehicle equipped with a safety device according to one embodiment.

FIG. 1 schematically represents the passenger area of a vehicle 1 equipped with a piece of vehicle interior trim.

In the present case, the piece of interior trim is a dashboard. However, in alternative embodiments, the interior trim of the vehicle could be a door panel, a roof liner, a seat, or any other type of trim element equipping the interior of a vehicle.

Advantageously, the dashboard 10 is a "foam-padded" dashboard and includes, as shown in FIG. 3, a dashboard body forming a rigid support layer 12, a foam layer, and a skin 14 covering the foam layer. The skin 14 is on the side intended to face the passenger area of the vehicle. The skin 14 thus constitutes an outer surface of the dashboard, this outer surface being visible from the passenger compartment. The rigid support layer 12 is composed for example of an insert made of a rigid plastic material constituting the inner surface of the dashboard 10. However, in alternative embodiments, the dashboard could be an "injection-molded" dashboard composed of a dashboard body constituting the sole element of the dashboard, or could be "thermo-covered", comprising a self-tearing skin covering the dashboard body.

A safety device 16 is housed under the dashboard body. More specifically, the safety device is arranged between the dashboard body and an airbag.

Figure 2:
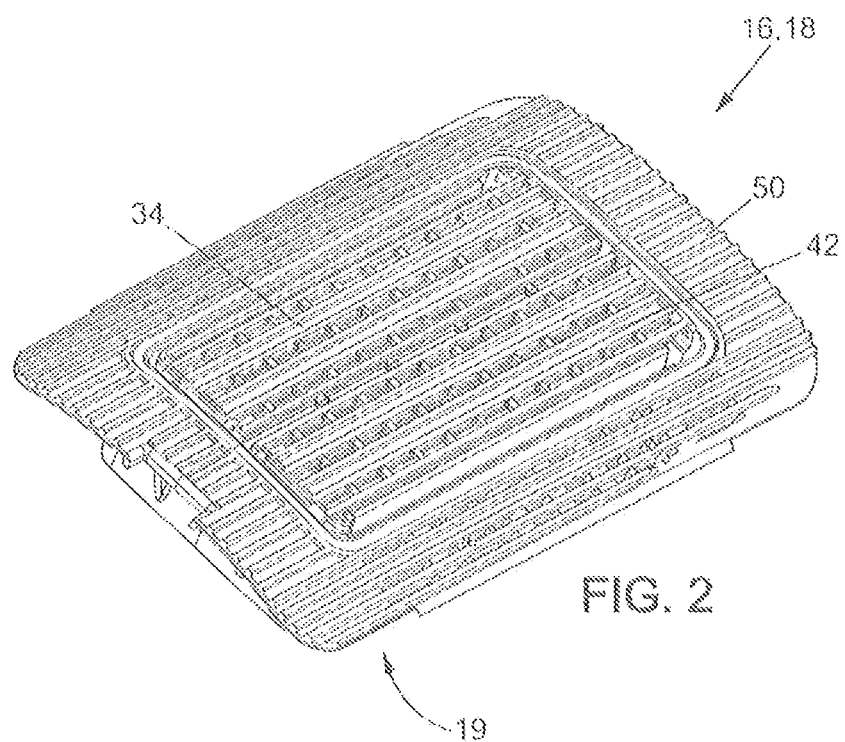
FIG. 2 is a perspective view of the flaps equipping the safety device of FIG. 1.
Figure 5A:
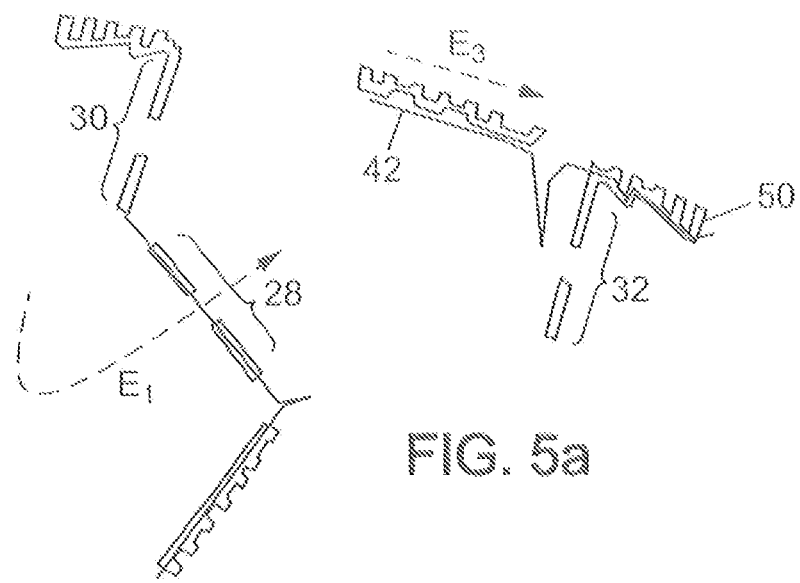
FIGS. 5a to 5d are sectional views of successive steps in the manufacture of the device.
Figure 5B:
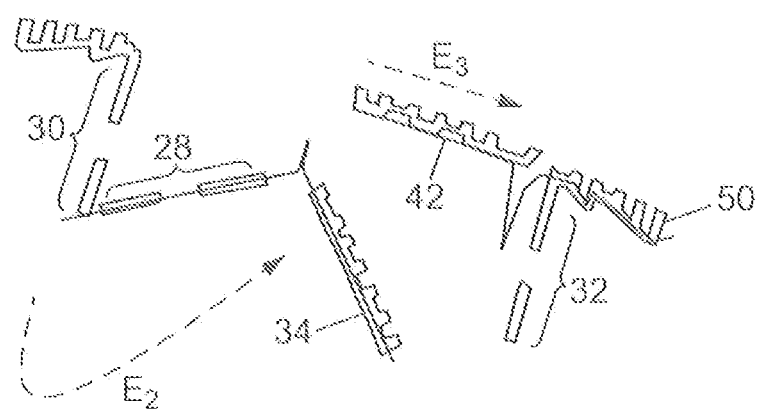
Figure 5C:
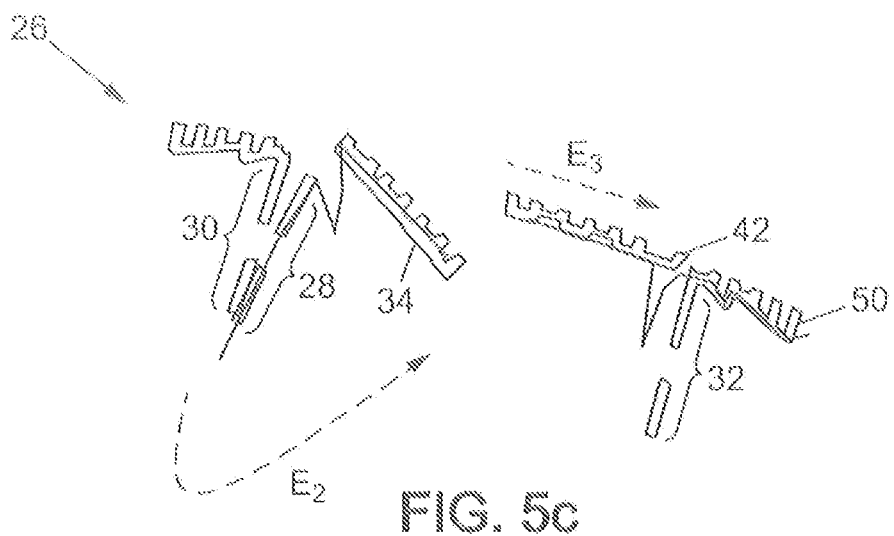
Figure 5D:
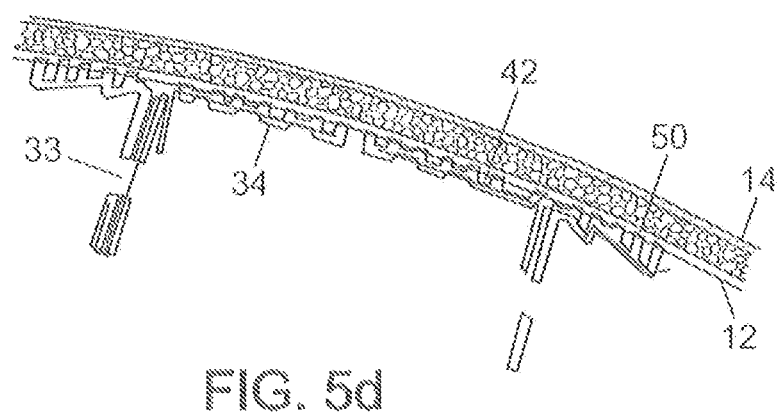

As represented in FIGS. 2 and 3, the safety device 16 comprises a chute channel 18 comprising a recess 19 adapted to receive the airbag. The chute channel 18 delimits an opening 20 for deployment of the airbag. In a known manner, during the rapid inflation of the airbag after an impact to the vehicle, the airbag is deployed through the opening into the passenger area of the vehicle.

The chute channel 18 is formed by a reinforcing member 26 defining side walls 22, 24 of the chute channel 18. The reinforcing member 26 is intended to be secured to the vehicle interior trim element. More specifically, and as represented in FIG. 3, the reinforcing member 26 is adapted to be secured to the inner surface of the dashboard 10.

The reinforcing member 26 includes a first reinforcing portion 28 comprising an inner face 29 facing the recess 19 of the chute channel 18 in the assembled state of the reinforcing member (also referred to below as the operative position), and an outer face 31 opposite said inner face (in other words, the outer face is facing the direction away from the chute channel 18 recess 19). The reinforcing member 28 further includes a second reinforcing portion 30 comprising an inner face 35 facing towards the recess 19 of the chute channel 18 and an outer face 37 opposite said inner face 35. In the operative position, the inner face 35 of the second reinforcing portion 30 and the outer face 31 of the first reinforcing portion 28 are opposite one another. In the operative position, the first reinforcing portion 28 and the second reinforcing portion 30 form a side wall 22 of the chute channel 18. The reinforcing member 26 further comprises a third reinforcing portion 32 intended to form a second side wall 24 of the chute channel.

Holes 33 are respectively provided on the first, second, and third reinforcing portions 28, 30, 32. More particularly, in the operative position of the first and second reinforcing portions 28, 30, a hole 33 is provided through the assembly composed of the first and second reinforcing portions 28, 30. The hole 33 is a through-hole and is positioned approximately mid-length along the first and second portions and is provided for receiving a first support hook for the airbag. Symmetrically, the third reinforcing portion 32 has a mid-length through-hole, provided for receiving a second support hook for the airbag.

The safety device 16 also comprises a first flap 34. The first flap 34 at least partially covers the opening 20.

The safety device 16 further comprises a first net 36. The first flap 34 and the first reinforcing portion 28 are overmolded onto the first net 36. The first net 36 defines a first intermediate net portion 38 situated between the first flap 34 and the first reinforcing portion 28. The first intermediate portion 38 functions as a hinge and allows the first flap 34 to move relative to the first reinforcing portion 28. Thus, in case of impact, the first flap 30 is able to pivot when the airbag inflates, which allows the release of the airbag. In this example, the first intermediate portion 38 of the first net 36 defines a loop 39. The loop 39 is actually formed by a portion of the first net 36 that is not overmolded, between the first flap 34 and the first reinforcing portion 28. The loop 39 may be sewn as the name suggests, or conversely may be left in an unassembled or "free" state where the strands of the loop are not sewn together.

The second reinforcing portion 30 is also partially overmolded onto the first net 36. More specifically, the second reinforcing portion 30 is overmolded onto the first net 36 in an area situated between the first reinforcing portion and the hole 33, provided for the airbag hook, of the second reinforcing portion 30. The first net 36 defines a second intermediate portion 40 between the first reinforcing portion 28 and the second reinforcing portion 30. The second intermediate portion 40 functions as a hinge which allows the first reinforcing portion 28 to pivot relative to the second reinforcing portion 30 so that the first reinforcing portion 28 is folded onto the second reinforcing portion 30 to form a side wall of the chute channel 18. The second hinge portion allows positioning the reinforcing member as described below with reference to FIGS. 5a to 5d.

As represented in FIGS. 2 and 3, the safety device 16 advantageously comprises a second flap 42. The first flap 34 and the second flap 42 completely or partially cover the opening 20. In a preferred embodiment, the first and second flaps 34, 42 define an H-shaped opening. In other words, the flaps are adjacent and the interface between the two flaps corresponds to a central region of a weakening line 43 (represented with dotted lines in FIG. 1). In addition, the weakening line 43 extends to each side of the central area to form an H that substantially delimits the two flaps. Advantageously, and to save space, the first flap 34 is nearer the windshield of the vehicle, while the second flap 42 is nearer the passenger side of the vehicle. The third reinforcing portion 32 and the second flap 42 are at least partially overmolded onto a second net 44. The second net 44 defines an intermediate net portion 46 located between the second flap 42 and the third reinforcing portion 32. The intermediate portion 46 functions as a hinge allowing the second flap 42 to move relative to the third reinforcing portion 32.

In this example, the intermediate portion 46 of the second net 44 defines a loop 48. The loop 48 is actually formed by a portion of the second net 44 that is not overmolded between the second flap 42 and third reinforcing portion 32. The loop 48 may be sewn, as its name suggests, or conversely may be left in an unassembled state.

More specifically, and as is most clearly visible in FIG. 3, the third portion 32 defines a side wall 24 of the chute channel and therefore extends laterally in a direction represented by the arrow D in said chute channel 18. As visible in FIG. 4, the third portion 32 has a length l and a thickness e. The second net 44 is overmolded within the thickness e of the third portion 32 and is additionally overmolded by a portion of a fastening strip 50 defining a transverse wall of the reinforcing member 26 forming the chute channel 18.

As represented in FIG. 2, the fastening strip 50 delineates the opening 30 and is intended to be placed facing the inner face of the dashboard. In the present case, and as seen in FIGS. 3 and 4, the fastening strip 50 is integral with the second reinforcing portion 30 and third reinforcing portion 32. The fastening strip 50 forms a non-zero angle with the second reinforcing portion 30 and the third reinforcing portion 32 respectively. Advantageously, the fastening strip 50 extends orthogonally to the side walls of the chute channel 18. The fastening strip comprises an outer face facing the inner face of the dashboard, and an inner face opposite the outer face. The outer face is additionally provided with welding ribs and is intended to be assembled to the dashboard by vibration welding.

FIG. 4 represents the safety device 16 in the molding position. The first flap 34, the first reinforcing portion 28, and the second reinforcing portion 30 have just been overmolded onto the first net 36. In the molding position, the first flap 34, the first reinforcing portion 28, the second reinforcing portion 30, and the portion of the fastening strip 50 that is integral with the second reinforcing portion 30 substantially form a U, its side arms defined by the first flap 34 and the portion of the fastening strip 50 integral with the second reinforcing portion 30. The first and second reinforcing portions 28, 30 are manufactured in alignment and form the base of the U connecting the two side arms. Areas that are not overmolded, particularly at the hinge connection between the first and second reinforcing portions 28, 30, are provided. The first flap 34 and the first reinforcing portion 28 are not integrally formed as one part, but are connected together by a first net portion forming a hinge and the loop 39.

The second flap 42 is overmolded onto the second net 44. The portion of the fastening strip 50 integral with the third reinforcing portion 32 is molded in alignment with the second flap 42. An area that is not overmolded is provided between the second flap 42 and the fastening strip integral with the third reinforcing portion 32. The area that is not overmolded is intended to form the loop 48 provided on the side of the second flap 42. The safety device 16 is formed in a single molding operation. The safety device is formed as a single piece.

With reference to FIGS. 5a to 5d, the safety device and the walls of the chute channel are reshaped by folding. First, the first reinforcing portion 28 is folded over the second reinforcing portion 30 along the arrows E1 and E2, and then the first flap 34 is pushed back so it is in line with the portion of the fastening strip 50 that is integral with the second reinforcing portion. In other words, the first flap 34 and the portion of the fastening strip 50 that is integral with the second reinforcing portion 30 are aligned. Next, the second flap 42 is moved translationally as indicated by arrow E3 so it is in line with the portion of the fastening strip integral with the third reinforcing portion. The first and second flaps 34, 42 are arranged to be adjacent to each other. Thus, the first and second nets allow completely reshaping the safety device into its operative position. The reshaped safety device is placed in a welding tool in the welding position, and the dashboard is welded to the safety device at the fastening strip and the first and second flaps 34, 42. With this arrangement, the area "unsupported" by the flap is nonexistent.

The invention claimed is:
1. A safety device for a vehicle, adapted to be arranged facing an airbag, comprising:

a chute channel delimiting a recess adapted to receive the airbag, the chute channel further delimiting an opening for deployment of the airbag, the chute channel being formed by a reinforcing member suitable for attachment to an element of the vehicle interior trim, said reinforcing member comprising a first reinforcing portion and a second reinforcing portion, a first flap at least partially covering the opening, a first net, the first flap and the first reinforcing portion being overmolded onto the first net, and said first net defining a first intermediate net portion between the first flap and the first reinforcing portion, the first intermediate portion functioning as a hinge allowing movement of the first flap relative to the first reinforcing portion so as to release the airbag when an impact occurs, wherein said second reinforcing portion is also overmolded onto the first net, and said first net defines a second intermediate portion between the first reinforcing portion and the second reinforcing portion, functioning as a hinge allowing the first reinforcing portion to pivot relative to the second reinforcing portion so as to fold the first reinforcing portion over the second reinforcing portion in order to form a side wall of the chute channel.

2. The safety device according to claim 1, wherein the first net forms a loop between the first flap and the first reinforcing portion.

3. The safety device according to claim 1, wherein a second flap is provided, said first and second flaps at least partially covering said opening.

4. The safety device according to claim 3, wherein said reinforcing member further comprises a third reinforcing portion, and the third reinforcing portion and the second flap are at least partially overmolded onto a second net, said second net defining an intermediate net portion situated between the second flap and the third reinforcing portion, said intermediate portion functioning as a hinge allowing the second flap to move relative to the third reinforcing portion.

5. The safety device according to claim 4, wherein the second net forms a loop between the second flap and the third reinforcing portion.

6. A method for manufacturing a safety device according to claim 4, comprising the steps of:

manufacturing the reinforcing member, first flap, and second flap, by overmolding a fastening strip, the first reinforcing portion, the second reinforcing portion, and the first flap onto the first net, and by overmolding the fastening strip, third reinforcing portion, and second flap onto the second net, the first and second reinforcing portions being manufactured in an aligned position, the fastening strip and second flap being manufactured in an aligned position, and the first flap being manufactured in a position facing the fastening strip;

folding the first reinforcing portion over the second reinforcing portion, pushing back the first flap so that it is arranged in alignment with the fastening strip, moving the second flap translationally so that it is arranged in line with the fastening strip.

7. The safety device according to claim 1, wherein the reinforcing member further comprises a fastening strip delineating the opening and intended to be placed facing the interior trim element.

8. The safety device according to claim 7, wherein the fastening strip is formed integrally with the second reinforcing portion and the third reinforcing portion, said fastening strip forming a non-zero angle with the second reinforcing portion and the third reinforcing portion respectively.

9. The safety device according to claim 1, wherein the reinforcing member is created by injection molding.

10. The safety device according to claim 1, wherein the first and the second reinforcing portions have a hole for receiving an airbag support hook.

11. A vehicle dashboard comprising a dashboard body, wherein the vehicle dashboard comprises a safety device according to claim 1, attached to an inner surface of the dashboard body by vibration welding, an airbag being assembled to said device.

* * * * *